United States Patent [19]
Youden et al.

[11] Patent Number: 5,606,359
[45] Date of Patent: Feb. 25, 1997

[54] VIDEO ON DEMAND SYSTEM WITH MULTIPLE DATA SOURCES CONFIGURED TO PROVIDE VCR-LIKE SERVICES

[75] Inventors: John J. Youden, Cupertino; Albert W. Kovalick, Santa Clara; Paolo L. Siccardo, Los Altos; Christopher R. Adams, Menlo Park; James E. Jensen, San Jose; David J. Coggins, Cupertino; Manu Thapar, Fremont, all of Calif.; Kari Santos, Boulder, Colo.

[73] Assignee: Hewlett-Packard Company, Palo Alto, Calif.

[21] Appl. No.: 269,796

[22] Filed: Jun. 30, 1994

[51] Int. Cl.⁶ .............................. H04N 7/14; H04N 7/173
[52] U.S. Cl. ................................ 348/7; 348/12; 348/13; 455/5.1
[58] Field of Search .................... 348/7, 12, 13, 348/17; 455/5.1; H04N 7/14, 7/16, 7/173

[56] References Cited

U.S. PATENT DOCUMENTS

| | | |
|---|---|---|
| 4,949,187 | 8/1990 | Cohen . |
| 5,027,400 | 6/1991 | Basi et al. . |
| 5,140,592 | 8/1992 | Idleman et al. .......................... 371/8.1 |
| 5,166,926 | 11/1992 | Cisneros et al. . |
| 5,172,413 | 12/1992 | Bradley et al. .......................... 348/7 X |
| 5,341,474 | 8/1994 | Gelman et al. ......................... 348/12 X |
| 5,421,031 | 5/1995 | De Tsey .................................. 348/7 X |
| 5,442,389 | 8/1995 | Blahut et al. ........................... 348/13 X |
| 5,442,390 | 8/1995 | Hooper et al. ......................... 348/12 X |

FOREIGN PATENT DOCUMENTS

| | | |
|---|---|---|
| 2117422 | 8/1993 | Canada . |
| 535807A2 | 4/1993 | European Pat. Off. . |
| 598516A2 | 5/1994 | European Pat. Off. . |
| 617563A1 | 9/1994 | European Pat. Off. . |
| 94/01964 | 1/1994 | WIPO . |
| 94/03851 | 2/1994 | WIPO . |
| 94/12937 | 6/1994 | WIPO . |

OTHER PUBLICATIONS

Globecom '90, Dec. 2, 1990, San Diego, CA; "Video On Demand: Is It Feasible?", W. D. Sincoskie; pp. 201–205.

Network and Operating System Support For Digital Audio and Video, 4th Int. Workshop, Nov. 3, 1993, Lancaster, UK; "The Evaluation of Video Layout Strategies on a High-Bandwidth File Server"; D. Shepherd, et al.; pp. 228–239.

Int'l. Conference on Communications, Jun. 23, 1991, Sheraton–Denver Technological Center, USA; "A Store And Forward Architecture For Video On Demand Service", A. D. Gelman, et al.; pp. 842–846.

Primary Examiner—John K. Peng
Assistant Examiner—John W. Miller
Attorney, Agent, or Firm—Jonathan B. Penn

[57] ABSTRACT

A video server for providing Video-On-Demand is disclosed. A plurality of data sources are coupled individually to a first and second bi-directional data/instruction switch. The first switch is additionally coupled to a data storage system and the second switch is coupled to a network interface. A real time controller is coupled to the data sources and the switches and can couple any part of the data storage system to any selected data source and any given network channel to any selected data source. A control system coupled to the real time controller and the second switch provides support services to the real time controller and acts as a gateway to third party services and products. The data storage system is largely comprised of disk drive arrays. Video data is striped across the individual arrays, each video data program that a user requests being striped across one array. Each array provides video data to many users through the data sources. The video server is tolerant of individual failures in the data storage system and among the data sources, as operating portions of the data storage system and spare data sources can be rapidly switched to substitute for failed units. The server can also be readily expanded and provides a user experience similar to that of a video cassette recorder.

29 Claims, 15 Drawing Sheets

PLAY TO FF

PLAY TO FR

FF TO PLAY

FR TO PLAY

VIDEO ON DEMAND SYSTEM WITH MULTIPLE DATA SOURCES CONFIGURED TO PROVIDE VCR-LIKE SERVICES

BACKGROUND OF THE INVENTION

This invention is generally in the field of digital computer systems and particularly in the field of video and multimedia computer servers.

The National Information Superhighway, a growing web of wide bandwidth communication channels which may soon interconnect most households and businesses in the United States, promises to provide many services to those connected to it. These services may include banking at home, instant access to large databases such as the Library of Congress, and real-time interaction with virtual communities of people with similar interests. Of the services that the Superhighway may make available, one that has received a great deal of corporate and media attention is the provision of video on demand ("VOD").

VOD holds out the promise that almost every movie ever made will be available to a user of the service at any time. Instead of driving to a video rental store and selecting a movie, users will be able to select any movie stored in the system's video library and have that movie delivered to them over the Superhighway.

Before the promise of VOD can be realized, many problems must be solved. Even a relatively short film of two hours duration contains approximately $2.2 \times 10^{10}$ bits of data. Standard methods to compress and store the vast quantity of data contained in a film library of thousands of titles must be agreed upon. Even after the data has been captured and stored, there is no agreement on any part of the system that will be needed to deliver the stored data to users.

Any proposed system must satisfy rigorous user demands. Users will want whatever film they have selected delivered to them quickly. They will also want the ability to start and stop the film at any point, as well as the ability to fast forward ("FF") and fast reverse ("FR") the film at will. Provision of these capabilities to every user at any time will place enormous demands on the system's storage units, internal buses, and processing units. Even the enormous bandwidth of fiber optic cable may be exceeded. Additionally, some two-way communication between the user and the system is necessary to communicate users' requests, as well as billing information and the like. This two-way communication places additional burdens on the system.

A fundamental aspect of a VOD video server is the provision of a large amount of data from a data storage system to many users at roughly the same time without significant processing of the outgoing data. What processing capability the system requires is usually relatively simple, such as billing the user's account and archiving the stored video source programs. Envisioning video servers as asymmetrical input/output ("I/O") engines is helpful.

The various system architectures proposed for video servers indicate that the asymmetrical nature of video servers has not been understood. Many proposals suggest the use of mainframe computers to direct and monitor the video data as it flows to the user. In these systems, every request for a film and most system control functions are processed by the mainframe's CPU. Latency time in such an environment can increase dramatically as the number of users increases. Such a use of a mainframe computer is wasteful of the system's processing capability. A video server based on this architecture would be expensive and difficult to expand.

Suggestions which propose the use of networks of personal computers ("PC"s) to provide VOD lack flexibility, as the architecture of PCs was never intended to access and control multiple data storage devices or to control high speed, wide bandwidth output busses.

Although so far discussed only in terms of delivering video data to users, proposed VOD systems will generate data streams which can also include audio, text, graphics and other data types. All references to video data in the specification and claims are intended to include data that comprises either entirely one of these enumerated data types or some mixture of them. Further, nothing herein should be taken to limit the present invention to the storage and transmission of the specifically enumerated data types only.

Before VOD can be realized, a new architecture capable of generating and controlling hundreds, if not thousands of video output streams at relatively low cost must be created. This architecture must be expandable, fault tolerant and capable of efficient operation with video data compressed and stored in any one of several competing formats. No such architecture is presently known.

SUMMARY OF THE PRESENT INVENTION

A first embodiment of the present invention comprises a video server whose architecture is easily expandable, redundant, and relatively inexpensive. In this first embodiment, two control systems run the video server and are optimized for two different classes of operations. The two control systems are a system controller and a real time controller. The system controller functions as the server's gatekeeper, determining which users may access the server. It also handles billing transactions, other data processing tasks, and maintains connections to other computers which may provide support services to the video server. The real time controller is coupled to the system controller and performs the time critical functions necessary to provide a particular user with a particular data stream. This task separation between the real time controller and the system controller helps optimize system performance and reduces the latency of a particular user request.

The real time controller is coupled to a plurality of components which store the video data, retrieve it, format it for transmission and finally transmit it to users. In this first embodiment, these components are a data storage system, a plurality of data sources and a first and second multiplex/demultiplex ("M/D") switch.

The data storage system comprises a large capacity archival storage element with a relatively slow data access and transmission rate and a plurality of smaller capacity disk drive arrays with higher data access and transmission rates than the archival storage element. The data storage system provides both long and short term storage for the video data. In typical use, video data in the archival storage element must be transcribed to the disk drive arrays before the video data is accessible to users.

The data storage system is in turn coupled to a plurality of data sources through a first M/D switch, which first M/D switch is in turn coupled to the real time controller and controlled by it. This first M/D switch provides complete bi-directional connectivity between the data storage system and the data sources. Each data source is capable of receiving several streams of video data from the data storage system and directing those streams to the appropriate user under the direction of the real time controller.

Within each data source, a high speed I/O bus connects the data storage system with a network interface. Video data sent from the data storage system comes into the data source and is placed in a first in, first out ("FIFO") memory buffer. Each data source has a plurality of FIFOs and other components which support multiple independent data streams.

The data sources are coupled to the network by a second M/D switch. The real time controller is coupled to the second M/D switch. Under the command of the real time controller, the second M/D switch provides complete bi-directional connectivity between the data sources and users.

The real time controller determines which user requested the data, which disk drive array in the data storage system will be used to provide the requested video data, and which data source will receive and process that data. The real time controller generates the proper commands for the first and second M/D switches, the data sources, and the data storage elements so that the user receives the requested data stream with a minimum of delay.

In a second embodiment of the present invention, the data sources are coupled directly to the data storage system.

In both the first and second embodiments, a spare data source is typically provided. The spare data source and a data storage element coupled to it store a copy of each video program currently playing. Alternatively, any subset of the active video data can be copied and stored, as well as video data that has only recently become inactive. If a data source fails, or if a data storage element fails, the spare data source and its data storage element can be coupled through the first and second M/D switches to the users that were supported by the failed data source and service to these users continues without perceptible interruption. This mirroring of the data and provision of at least one spare data source provides the present invention with adequate fault tolerance.

In either embodiment, a separate subsystem monitors the performance of all components in the system on a regular basis and provides warnings and information to operators of when and where failures have occurred. This warning and information allows the real time controller to disconnect failing units and substitute operational ones.

The first and second embodiments can be expanded by the addition of more data sources, as well as by increasing the size of the data storage system.

In operation, the video server receives a user request transmitted from the user's set top box ("STB") through a distribution network to the server. The request is routed through the second M/D switch to the real time controller, which furthers it to the system controller. If the system controller determines that the user is permitted access and that the requested video data is in the storage system, the system controller orders the real time controller to permit user access and tells the real time controller where the video data is stored.

If the requested video data is not already available on one of the disk drive arrays, the archival storage subsystem begins transcribing the video data to the plurality of disks which comprise a single disk drive array. A predetermined fraction of the video data is stored on each disk sequentially, with each disk receiving many small portions of the film. Herein this technique is called "data striping". Although it ordinarily takes several minutes to transcribe the entire video data program to the selected disk drive array, the video server can begin transmission of the video data to the user after only a few minutes of the program have been transcribed.

Providing users with FF and FR viewing modes is herein accomplished by preparing special FF and FR versions of each video data program. These special versions comprise selected frames of the original video data, which frames are then further edited to remove visual details than cannot be detected when the film is viewed in a FF or FR mode. The selected video data for the FF version is stored in the same order as the original video data is stored, and the selected video data for the FR version is stored in reverse order to the original video data. These versions are stored along with the original version of the video data. When the video data program is requested, all three versions of the program are striped to the disk array that has been selected to support the user.

After the initial predetermined portion of the video data has been striped to the selected disk array, play may begin. A special initial prefetch of video data reads the beginning segments of the video data stored on each of the disks in parallel and sends these segments serially to the FIFO memory buffers supporting the user. This initial prefetch provides the user with enough video data for at least a few seconds of viewing.

Each disk in the disk array can support several users at a given time. In a given time interval, the rate that data can be read from the disks is more than adequate to support the needs of several users, if proper access scheduling is maintained. In the present invention, user time slots are assigned and maintained to assure an adequate video data supply from the disk array to the users.

If the user switches from play to either FF or FR, or vice versa, the video server reads the FF or FR video segment on the disk being accessed, the server selecting the segment which is closest in time sequence to the video data currently being displayed.

The present invention will now be described in detail with reference to the figures listed and described below.

BRIEF DESCRIPTION OF THE ILLUSTRATIONS

DETAILED DESCRIPTION OF THE PREFERRED EMBODIMENT

Figure 1:
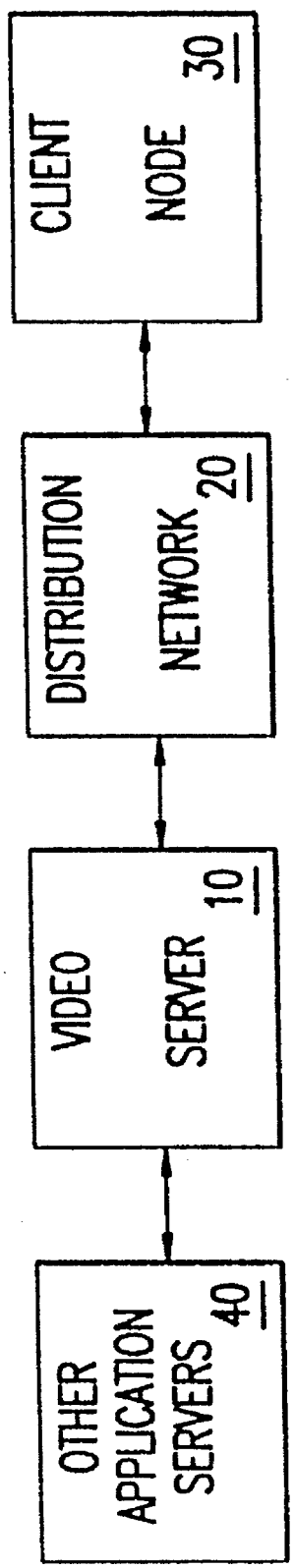
FIG. 1 is a block diagram showing the operating environment of the present invention.

FIG. 1 is a block diagram showing the operating environment of the present invention. The present invention, video server 10, is coupled to a distribution network 20 and to other application servers 40. Distribution network 20 may be a fiber optic network, co-axial cables, twisted pairs, or any other type of digital data network with a large number of individual communication channels. A wireless distribution network using infra-red ("IR"), radio frequency ("RF"), or microwave electromagnetic waves may be used alternatively. The network will typically have a large bandwidth, but the type and capabilities of the distribution network are only peripherally relevant to a description and understanding of the present invention. Client node 30 is coupled to video server 10 through distribution network 20. Communications between the client node, the distribution network and the video server are typically bi-directional. Client node 30 may comprise an individual user's TV STB, any general purpose computer, or any other entity capable of requesting and receiving video data. Indeed, client node 30 could comprise another video server 10. References herein to "users" should be taken as synonymous to "client node".

Application servers 40 are coupled to video server 10 by means of a bi-directional communications channel. Application servers 40 might provide such services as billing, statistical analysis of video program usage, etc.

System Architecture

Figure 2:
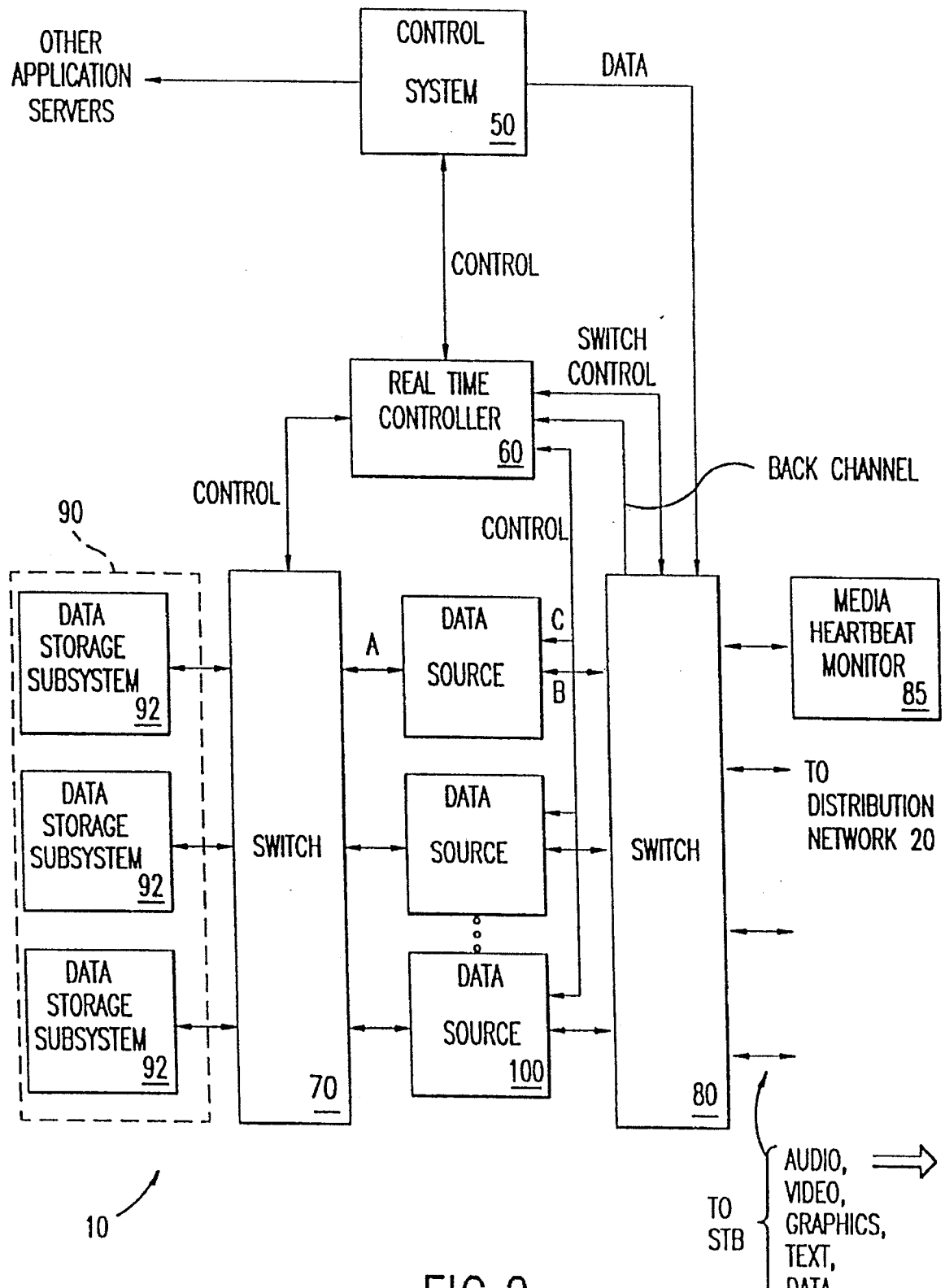
FIG. 2 is a block diagram of a first embodiment of the present invention.

FIG. 2 is a block diagram of the first preferred embodiment of the present invention. M/D switches 70 and 80 respectively couple data sources 100 to data storage system 90 and data sources 100 to distribution network 20 (see FIG. 1). M/D switches 70 and 80 are capable of coupling any of their input sources to any of their output sources and function as multiplexers/demultiplexers. The M/D switches do not have to be unitary. Multiple smaller M/D switches, either blocking or non-blocking, can be used. In this first embodiment, a FiberChannel M/D switch serves as M/D switch 70 and an Asynchronous Transfer Mode ("ATM") M/D switch serves as M/D switch 80. These types of M/D switches are commercially available and require no further description. Other M/D switches such as a SCSI switch or a time division crossbar equivalent switch could be used without changing this first embodiment in any substantive way.

Each data source 100 is coupled to M/D switches 70 and 80 as well as to real time controller 60. Each data source 100 provides video data to many independent, interactive users simultaneously. The data sources provide short-term storage for video data including Motion Picture Entertainment Group ("MPEG") encoded data, scripts, and interpreters and metadata about that video data. The data sources also play the individual data streams for each user at a rate that assures continuous service. To this end, they format and buffer data received from data storage system 90 through M/D switch 70 and transmit it through M/D switch 80 to the distribution network at the appropriate rate. The construction and operation of data sources 100 is discussed in detail below.

Real time controller 60 is coupled to M/D switches 70 and 80, data sources 100, and to control system 50. Real time controller 60 directs the connection of a particular disk drive array 92 to a particular data source 100 and the connection of a particular data source 100 to one of the communication channels in the distribution network. The real time controller also controls ongoing interaction with a given user, such as FF and FR commands. In this first preferred embodiment, real time controller 60 is comprised of an HP series 700 work station, which is a general purpose digital computer and runs a real time operating system. As this type of computer is known, no further description of it is necessary. Other types of general purpose digital computers could be used instead of the HP work station.

Control system 50 is coupled to real time controller 60, M/D switch 80, and application video server 40 (see FIG. 1). Control system 50 provides those services requiring data processing to a given user. These services include logging on and off, which further includes checking personal identification numbers ("PIN"s) and verifying credit, billing users, possibly through application servers 40, operational support such as adding new users to the subscriber lists and adding new films to the library of available films, and interactive program support. In this first embodiment, an HP 9000 Series 800 general purpose digital computer running the HP-UX operating system is used as control system 50. Any general purpose computer system with the same performance level as the Series 800 computer could be used.

Media heartbeat monitor 85 is coupled to the output of M/D switch 80. A media heartbeat program comprised of low information content video data in MPEG format is stored in a striped format on each of the disks in all of the disk arrays that comprise part of the data storage system 90. The program is transmitted continuously from all the disks in system 90 through each of the M/D switches and the data sources and eventually relayed to monitor 85. Monitor 85 reports to real time controller 60 any irregularities detected in any of the components, such as not receiving the program from a particular disk or data source. Any data path failure due to hardware or software malfunctions will be detected and reported by monitor 85 through a back channel to real time controller 60. Real time controller 60 can then command the proper corrective action, such as switching a different data source into service, selecting a different data storage subsystem 92, or reissuing a lost message.

This first embodiment can be expanded in several ways to provide services to more users. Each data source can be scaled to a larger storage size by increasing the storage size of each disk in its associated disk array. More data sources can also be added to the system until all bandwidth between components is fully saturated. This first embodiment, in its base configuration, can offer 300 video and other data streams at 3 megabits per second per stream. Other bit rates per stream are possible and the system can be expanded beyond 300 video data streams. Also, multiple video servers can be interconnected over a broadband network to increase overall capacity.

Figure 3:
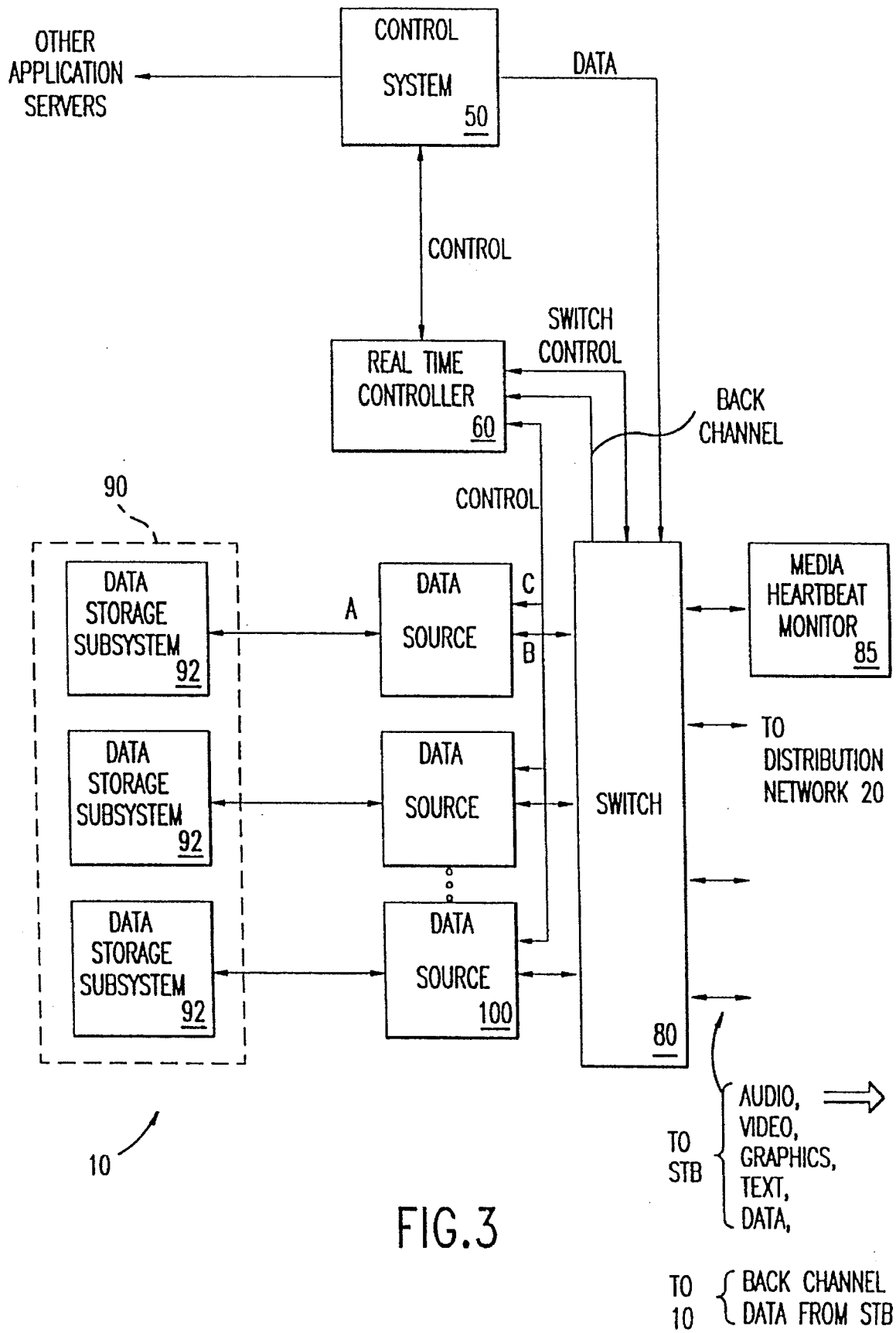
FIG. 3 is a block diagram of a second embodiment of the present invention.

A second embodiment of the present invention is shown in FIG. 3. The two embodiments are identical except that M/D switch 70 is removed in this second embodiment and data storage system 90 is coupled directly to data sources 100. The advantage of this embodiment is a slightly simpler architecture which costs somewhat less than that of the embodiment shown in FIG. 2, without a large sacrifice in the capabilities of the first embodiment.

Data Source

Figure 4:
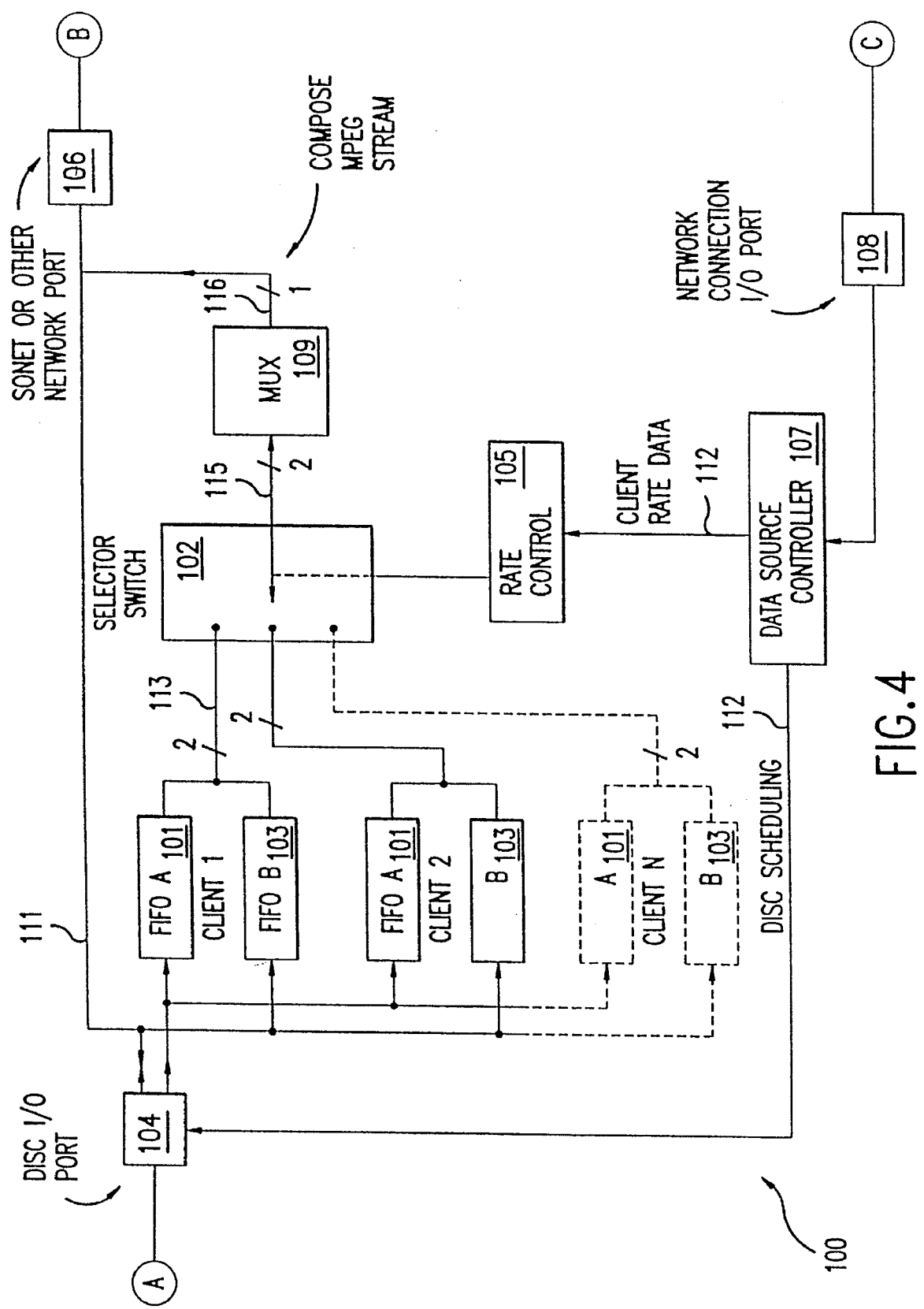
FIG. 4 is a block diagram of the data sources shown in FIGS. 2 and 3.

FIG. 4 is a detailed block diagram of a single data source 100. Data source 100 accepts as input video data from storage system 90 (see FIGS. 2 and 3), as well as other types of data from other sources. From these various sources of data, data source 100 forms a single outgoing bit stream, the bit stream formed from successive packets of data, which bit stream provides a plurality of users with video services.

Data, usually MPEG video/audio data from data storage system 90 (see FIGS. 2 and 3) enters the data source 100 through disc I/O port 104. The port is bi-directional. SONET or other network port 106 is also bi-directional and usually carries text or other data from real time controller 60 or control system 50 into data source 100. Port 106 can be used to send data to port 104 for writing to data storage system 90.

For each user that data source 100 supports, a pair of FIFO memory buffers 101 and 103 is allocated. For N users, N pairs of FIFO memory buffers 101 and 103 would be needed. Although the FIFO memory buffers are illustrated in FIG. 4 as individual FIFO memory buffers, they can be implemented in many different ways. For example, a single large random access memory ("RAM") could be accessed as a plurality of FIFO memory buffers. FIFO memory buffers 101 receive bytes of data from disc I/O port 104 and FIFO memory buffers 103 receive bytes of data from network port 106.

The use of two FIFO memory buffers for each user is by no means required. A single buffer could be used, which would eliminate the need for a multiplexer/demultiplexer to combine the contents of the pair of FIFO memory buffers. The disadvantage of this arrangement would be the inability to combine data streams in real time. Alternatively, more than two FIFO memory buffers could be used, giving the option of combining several data types simultaneously in real time, the disadvantage being the additional cost and complexity of the additional FIFO memory buffers.

Figure 5:
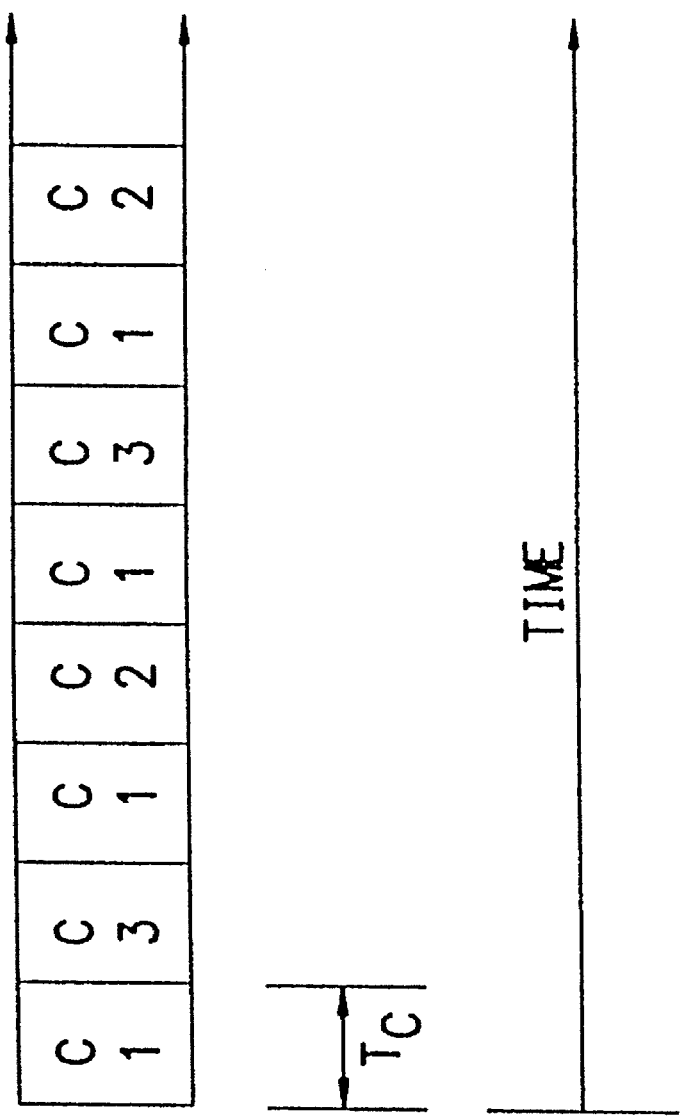
FIG. 5 illustrates how the programmable rate generator insures the proper time multiplexing of the data source output channel.

Selector switch 102, rate control 105, and data source controller 107 cooperate to insure that data is sent to each user at the rate that that user requires. As shown in FIG. 5, the output of MUX 109 (FIG. 4) consists of data cells placed into fixed time slots of length $T_C$. Each cell contains a portion of the combined MPEG data stream for an individual user. Cells for the users associated with network port 106 are interleaved in such a way as to provide each user with the bandwidth that the user requires. In the example shown in FIG. 5, user C1 requires data at twice the rate that either user C2 or C3 does, and both C2 and C3 require data at the same rate. C1 receives four cells of data during the illustrated time period, while both C2 and C3 receive 2 cells of data each. Cells for each user are issued at a fixed rate by allowing a fixed time period between each cell.

In the example shown in FIG. 5, the fixed time periods between cells for each user are integer multiples of the fixed time periods between cells for other users, and also integer multiples of the time period $T_C$ of each time slot. This need not always be the case. As a result of mismatches between the desired time periods between cells and the available boundaries of the time slots of length $T_C$ issuance of a cell may need to be delayed until the next available time slot boundary. It is also possible for cells of more than one user to vie for the same time slot, resulting in a delay in issuing one or more cells. Rate control 105 must generate various clocking rates from a fixed clock frequency in a manner that keeps these delays within acceptable limits and still provides the average user rate that is correct. Each user requires an independent rate to insure proper data delivery. The construction and operation of one possible implementation of rate control 105 is described in a co-owned and simultaneously filed U.S. patent application entitled "Programmable Rate Generator", app. Ser. No. 08/269,977, filed Jun. 30, 1994. The contents of that application are incorporated by reference for all purposes. Another implementation of rate control 105 uses a commercially available "ATMizer" integrated circuit available from LSI Logic, Inc., Milpitas, Calif.

Selector switch 102 (FIG. 4), using the rate determined by controller 107 and generated by rate control 105, switches data from FIFO memory buffers 101 and 103 for each user to MUX 109.

MUX 109 receives the video and other data from switch 102 and merges the two incoming data streams into a single outgoing legal MPEG data stream. If other compression methods and protocols are used, MUX 109 can be programmed to format the data received from switch 102 into a data stream which accords with this new protocol. After MUX 102 formats the data stream, it sends the data stream to port 106.

Data source controller 107 is coupled to real time controller 60 through port 108 and insures that the data streams flow out to the network via port 106. Controller 107 directs information arriving from M/D switch 80 including text and graphics to either data storage system 90 or FIFO memory buffers 103, where it can be mixed with video data from the data storage system and then retransmitted to the network. The capabilities of data source controller 107 are not exhausted by the generation of the single outgoing data stream. It is possible to generate additional data streams by providing an additional assembly of FIFO memory buffers, selector switches, MUXes and rate controls which mirrors the assembly already described. This pair of assemblies would be under the command of a single data source controller 107.

Buses 111, 113, 115, and 116 which interconnect the components of the data source as shown in FIG. 4 are high speed I/O buses. The bandwidth of these internal buses is wider than the bandwidth of the network channels which are coupled to the data source. Control busses 112 couple data source controller 107 to rate control 105 and disk I/O port 104.

At least one data source 100 serves as a system spare. The spare disk array of data storage system 90 coupled to the spare data source contains a copy of each video data program that a user of the system is viewing or using. It can alternatively store a subset of the active films as well as recently inactivated films. If the data source or disk array supporting a user fails, the spare data source can be coupled to the users of the failed data source or disk array and the video data programs stored thereon are available to the user with at most minimal interruption.

Data Storage System

Figure 6:
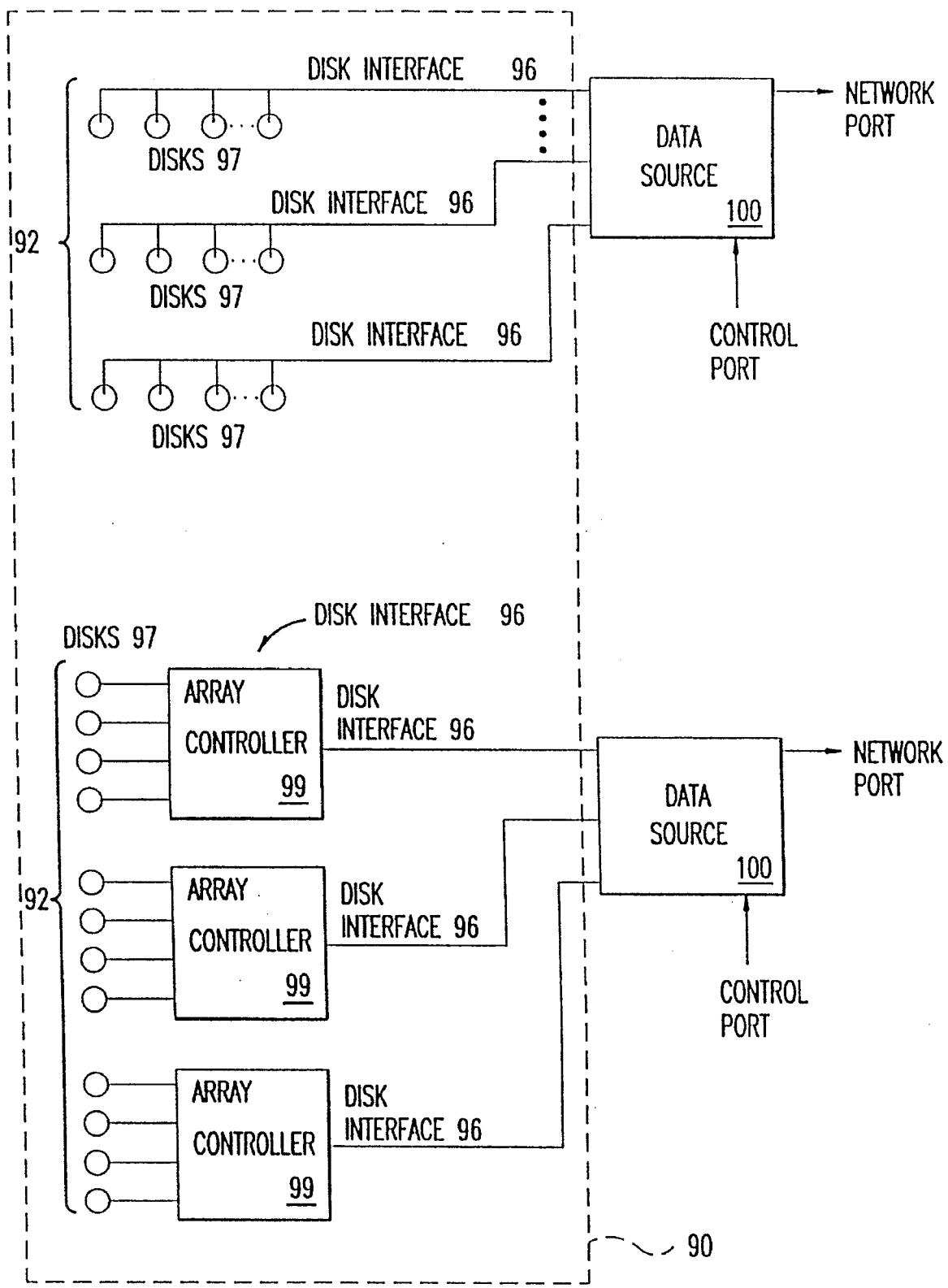
FIG. 6 is a block diagram of the data storage subsystem.

FIG. 6 is a detailed block diagram illustrating a first and second group of disk drive arrays 92 coupled to a first and second data source 100. Each group of disk drive arrays 92 is comprised of a series of disk drives 97 coupled through a disk drive interface 96 to data source 100. In the second group of disk drive arrays 92, a predefined number of disk drives 97 are coupled to an array controller 99. Array controller 99 can generate and monitor a parity check among the disk drives coupled to it. This adds another level of redundancy to the present invention, as array controller 99 can remove a failed disk drive from the array. Archival storage (not illustrated) can be provided by a tape "jukebox" comprising two digital tape drives and robotically accessed 8 mm cartridges. Over 2,000 hours of video data can be maintained in the 1.5 Terabyte tape system. This system can transfer a 90 minute film to primary disk memory in 15 minutes. Although not illustrated, archival storage can be coupled directly to the disk drive interfaces 96 or to system controller 50 (see FIG. 2). Optical CDs, digital audio tapes, random access memory ("RAM") or a redundant array of inexpensive disks ("RAID") could replace some or all of disk drives 97 as acceptable storage elements. In the preferred embodiment shown in FIG. 2, disk drives formed into one dimensional arrays and at least one tape jukebox are the preferred storage elements. They are logically arranged as one dimensional arrays coupled to individual data sources 100.

In order to reduce search and seek time, an averaging algorithm is used when writing data to the disk memories. It is known that parts of the disk memory rotate at different speeds. Reads from the outer portion of the disk acquire more data per unit time than reads from the inner portion. The difference can be as much as twice per unit time. In the present invention, data is written alternatively to inner and outer portions of the disk memories as video data is striped across the disk array. This increases the average amount of video data that can be read per unit time.

Operation

Data Compression and Storage

Video data on the video server is organized on the disk drives that comprise the data storage subsystems by splitting a given movie into several pieces which are then distributed across the disks that comprise the subsystem. This technique is herein called "data striping". Each stored movie is striped in this fashion across a plurality of disks when the film is being used.

The present invention assumes that video data will be delivered to it in compressed form. MPEG and Joint Photographic Expert Group ("JPEG") formats are both known and can be used with the present invention. Most, if not all decompression occurs at the user's terminal. The particular compression/decompression method used is not a material part of the present invention. Indeed, certain users, such as film editors, may need to work with video data that has not been compressed. The present invention can just as readily store such data as it can compressed video data and the use of such data would only affect the amount of data that can be stored and not the operation of the present invention.

Once the compressed video data is received, it is written to the disk drives comprising part of the data storage system in blocks of size N. In this first embodiment of the present invention, the block size is 128K bytes of data. The first disk drive in the logical array of disk drives receives the first 128K bytes, the second receives the next 128K bytes, and so on. After the last disk drive in the logical array receives its block of data, writing resumes with the first disk, until the entire film has been written to the disks.

The demands of user requested FF and FR require special attention. As all the video data is already stored in the data storage system, FF at least seems to be a simple task. Unfortunately, video data cannot simply be read at a faster rate and then sent through the distribution network to the user. This would create a data stream with illegal timing stamps that cannot be decoded by the user's STB. Reading the data faster and only sending a portion of it to the user also creates an illegal data stream. For FR, these methods also fail, as a movie compressed in the MPEG format cannot be played backwards. If any images could be recovered using these methods, the images would be of low quality and they would require real time processing of the video data as well as the cooperation of the user's STB.

In the present invention, a separate FF and FR version of each film is created. A predetermined percentage of the frames in the uncompressed play version of the video data are deleted. Details that a user cannot observe while viewing video data in FF and FR are then deleted from the remaining frames. The selected and edited frames are then recompressed and stored in a legal compressed format. The FR version requires that the edited frames be stored in reverse order as compared with the FF version. Reordering the frames to produce the FR version can occur prior to or after compression. Proper frame selection and proper elimination of unnecessary detail can reduce the original play version of the video data by up to 98%. As with the original film, the FF and FR version are striped across the disk storage units. When the user requests the FF and FR functions, these FF and FR versions of the film are used and played at the normal system playback rate. In this embodiment, the FF and FR versions play in about 5% of the time required to play the original film.

This method of creating and storing FF and FR versions of the films saves both bandwidth and storage space, yet produces a high quality set of FF and FR images.

A given disk drive can only support a fixed maximum number of users and their associated streams of video data. By striping all of the video data across all of the disks, user load balancing can be done efficiently. For example, if all the users request the same film, all the disks in the subsystem can participate in supplying the video data, as each disk contains a part of the movie. If each user requests a different film, each disk again participates as every disk contains at least a part of every film.

If each movie were stored on only one disk, the second case, where each user requests a different film, would still perform adequately, as each disk would support a single individual. However, if all users requested the same film, only those users who could be supported from a single disk could be serviced.

User Access

FIGS. 7a through 7d are flow charts depicting typical system operations involving user access and video data display. At step 201, a user, through his or her STB makes a request which is transmitted over one of the communication channels in distribution network 20 (see FIG. 1) to real time controller 60 (FIG. 2) to start a video data program. At step 203, real time controller forwards this request to control system 50 (FIG. 2) to determine if the user will be granted access to the system. The control system 50 can then grant the user system access and find the film the user requested at step 205. At step 207, control system 50 commands real time controller 60 to begin playing the film.

At any given time, the video data program requested will not be striped to a disk array, unless the film is very popular. Transcribing the video data program from the archival storage system to a disk array can take several minutes, particularly if the video server is in heavy use. Latency in such cases may exceed an acceptable limit.

To minimize this problem, the first five minutes of the two hundred most popular films can be "pre-striped" to one or more disk arrays. A request for one of these films would be serviced quickly with the pre-striped video data, while the remainder of the video data program is recalled from archival storage and transcribed to the disk array. As video data can be transcribed faster than it is used, this method results in the user experiencing few delays in receiving the requested video data. The list of pre-striped programs would be changed periodically.

Once real time controller 60 receives a command to begin playing a film, it begins a prefetch to fill the appropriate buffers in data source 100 (FIG. 2). This occurs at step 209 in FIG. 7b.

After the user has been granted access to the system, further VCR commands such as pause and FF/FR are dealt with exclusively by real time controller 60 interacting with the data storage system, the data sources and the switches. The system controller is not involved in these requests.

Fast Prefetch on Startup

As previously stated, video data programs are stored in a "striped" pattern on disk drive arrays 92 that comprise the short term storage portion of data storage system 90 (see FIG. 2).

The FIFO memory buffers in the assigned data source are either empty or they contain non-relevant material from a previous assignment. System resources permitting, the data source will command the disk drive interface (see FIG. 6) to simultaneously fetch data from several of the disks 97 over which the film has been striped. This fetched video data is transmitted serially to data source 100, filling the FIFO memory buffers as quickly as possible. This process, called herein "fast prefetch on startup", insures that each user will immediately have enough data in their assigned FIFO memory buffers to insure uninterrupted transmission for a period of some seconds.

At step 211, real time controller 60 assigns the user a user time slot ("UTS").

User Time Slots

If only a single user was permitted to access a single array of disk drives, there would be no need to stripe the video data across the disk drive array. All three versions of a video data program could be placed on one disk, with a second disk possibly serving as a backup. The video server would then read from the disk sequentially, using whichever version of the video data that the user requested. Although this method of use would be conceptually simple, any video server which devotes a separate disk drive to each user cannot be economically practical for a large number of users.

As the video server described herein, in all its embodiments, does contemplate serving many users simultaneously, a more efficient method is needed to maximize disk usage.

Each disk in any one of the disk arrays used can read and transmit video data to the data source it is coupled to at a much faster rate than any one user coupled to the data source can utilize the data. Given the disk's maximum sustained video data read rate, a predetermined time period, herein called the master time interval, is selected. The precise length of this interval is dependent on the configuration of the system and the types of disks used. Therefore, it may vary from one video server to the next without in any way altering the teaching of the present invention. The amount of video data that can be read in the master time interval is divided by the average amount of data that an individual requires. The result is the number of users whom the disk can support during each master time interval and represents the number of user time slots available in each master time interval. By assigning each user coupled to the same array of disk drives a particular user time slot in any given master time interval, conflicts over disk access can be eliminated and the number of users that can be reliably supported by a given disk drive array can be maximized.

Figure 8:
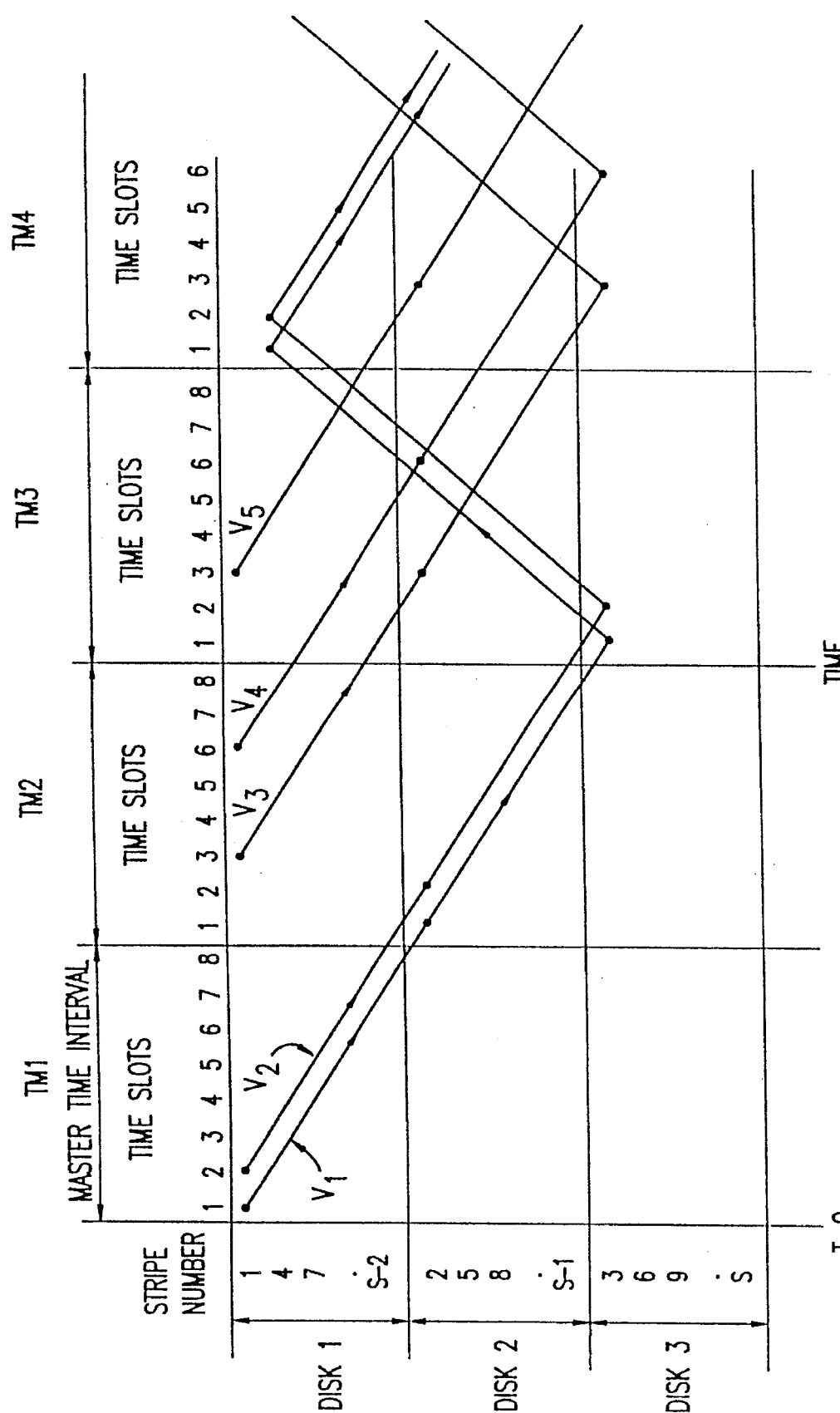
FIG. 8 is a graphical presentation of the User Time Slot ("UTS") process.

FIG. 8 is a timing diagram showing how the present invention's master time intervals, user time slots, and data striping prevent user resource conflict for disk access and data. The array illustrated in FIG. 8 is comprised of three disk drives, Disks 1, 2, and 3. Master time intervals TM1, TM2, TM3, and TM4 extend across the "X" or time axis of the figure. Within each master time interval, it has been predetermined that eight users per disk can be supplied with video data without risking insufficient service to any particular user. Therefore, each master time interval has been divided into eight user time slots which are shown subdividing each master time interval. It also bears repeating that video data has been striped across the disk array. The stripe number indicates the stripe indexes of the video data program which has been striped across the three disks comprising this disk array. "S" indicates the total number of stripes in the video data program.

Within any time slot, only one user can access any one disk. FIG. 8 indicates the access of the disk in a time slot by a user with a dark.

In time slot one of master time interval TM1, user V1 reads stripe one from disk one. User V2 reads stripe one in time slot two. Users V1 and V2 then move in parallel through the disk array, reading stripe two from disk two in, respectively, time slots one and two of master time interval TM2, and reading stripe three from disk three in, respectively, time slots one and two of master time interval TM3. As stripe four is on disk one, users V1 and V2 return to disk one in master time interval TM4, reading stripe four in time slots one and two, respectively. Users V3 and V4 access the same video data as users V1 and V2, but staggered in time from them. Users V3 and V4 have been assigned time slots three and six and they proceed in parallel in a fashion similar to V1 and V2. In master time interval TM3, users V3 and V4 read the second stripe of video data from the second disk in time slots three and six, respectively. In master time interval TM4, users V3 and V4 read stripe three from disk three in the same respective time slots.

User V5 begins reading video data in master time interval TM3 and is assigned time slot three. Although user V3 has also been assigned time slot three, users V5 and V3 always access different disks in their time slot. Their access of the same disk is always staggered by at least one master time interval. This allows maximum usage of the disk drives without any conflicts.

The array assumed by the timing diagram of FIG. 8 can provide adequate memory support for eight users per disk per master time interval, with 24 users per master time interval being the illustrated array's maximum load. If a 25th user request access to the disk array, access would be denied. It should be emphasized that at any one time, only one user accesses a given disk.

Figure 9:
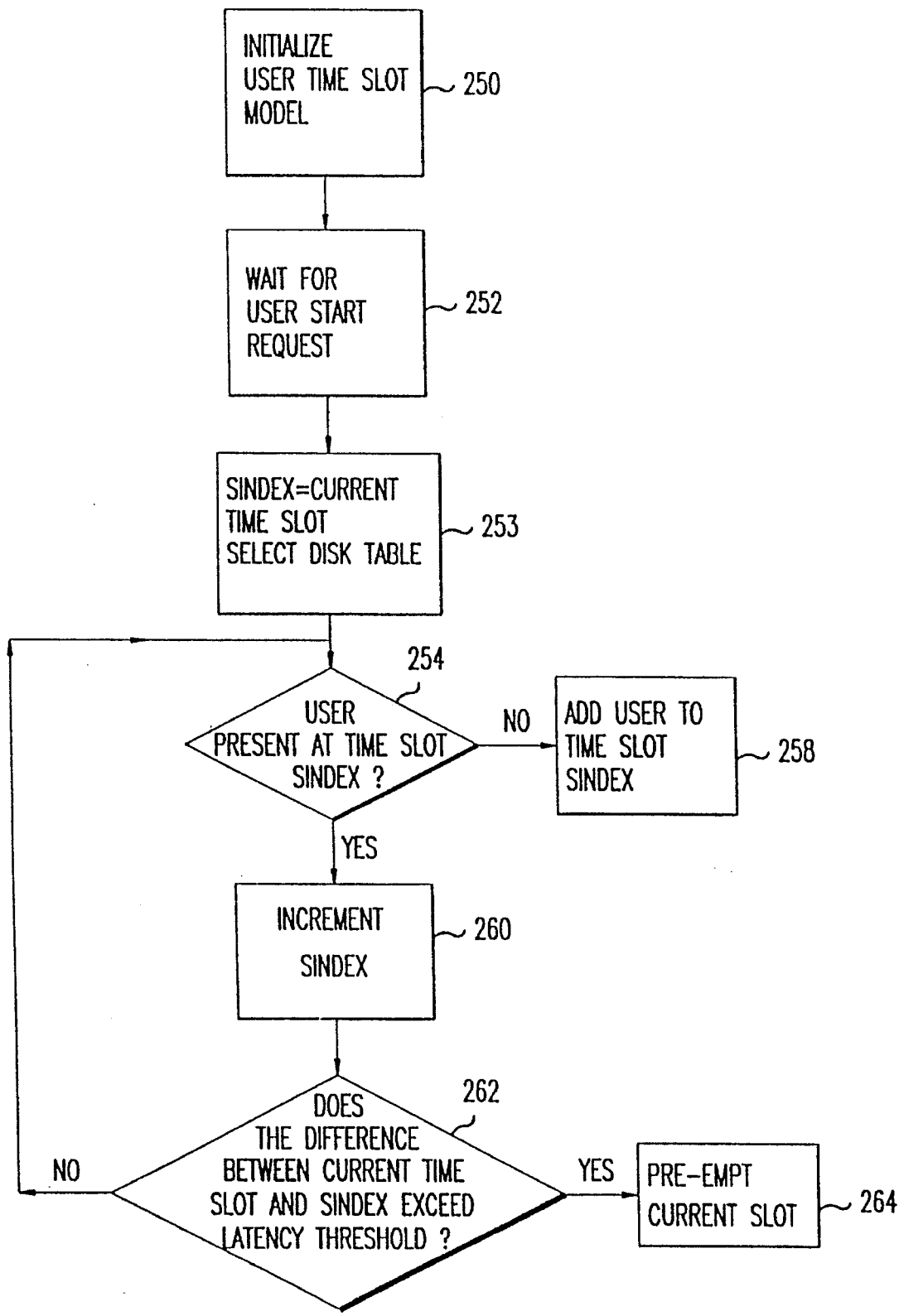
FIG. 9 is a flow chart of the process for assigning a UTS.

FIG. 9 is a flow chart of the process of assigning a UTS. The UTS model is initialized at step 250 and waits for a user start request at step 252. When the request is received, some disks may be servicing users. This moment in time that the request is received is called the "current time slot". The remaining steps in the flow chart shown in FIG. 9 are executed within the period of time defined by the current time slot.

Once the request is received, the system determines which disk contains the first data block required by the user. Once the system has determined which disk contains the first data block, the system examines that disk to determine if it can accommodate the user's request. Each disk has a table that indicates which UTSs are occupied by users. The system examines the table using an index called "$S_{index}$". $S_{index}$ is initialized to the value "current time slot" and the appropriate disk table is accessed (step 253). The system then examines the disk's UTS table, with the table index set equal to $S_{index}$.

The table indicates if the UTS pointed to by $S_{index}$ is already occupied by another user (step 254). If the UTS is available, it is assigned to the user and the user immediately fetches data from the disk (step 258). If the UTS is not available, $S_{index}$ is incremented (step 260). The difference between $S_{index}$ and the current time slot is then examined (step 262). If this difference exceeds a threshold for acceptable user latency, the process terminates and bumps the current user from the current UTS (step 264).

Bumping a user does not result in the interruption of that user's video data program. In a process described below, the FIFO memory buffers assigned to each user tend to be almost completely full. Losing one's time slot in a particular master time interval only results in the video data in the FIFO memory buffers being used. Before all the video data has been used, the bumped user will be reassigned a time slot.

If the latency evaluated at step 262 has not been exceeded, control returns to step 254. These calculations occur in the disk interface controlling the disk array.

Fast Disk Fetch

In typical operations, many users will be accessing films stored on the disk drive arrays coupled to a single data source. The rate at which a user can utilize the data is fixed. In this preferred embodiment, most users need about 3 megabits of video data per second. Users of a common data source may have the same data consumption rate or they may have independent rates. This does not affect the operation of the present invention. For optimum operation, and to permit accessing the proper video data from the spare data source in the event that the assigned data source or its assigned data storage subsystem fails, the individual FIFO memory buffers in the data sources should be kept as full as possible.

In the present invention, data is fetched from the disk arrays at a rate slightly greater than the average rate that the data is used. This keeps the FIFO memory buffers, on average, closer to being full than to being empty. As system usage is expected to be high, the stoachastic process of filling the buffers at a faster rate than data is used will not always succeed in keeping the buffers completely full, but it will tend to insure that they approach their maximum capacity. This aggressive scheduling is possible with video data as it is sustained at a constant rate over a very long period of time.

Figure 10:
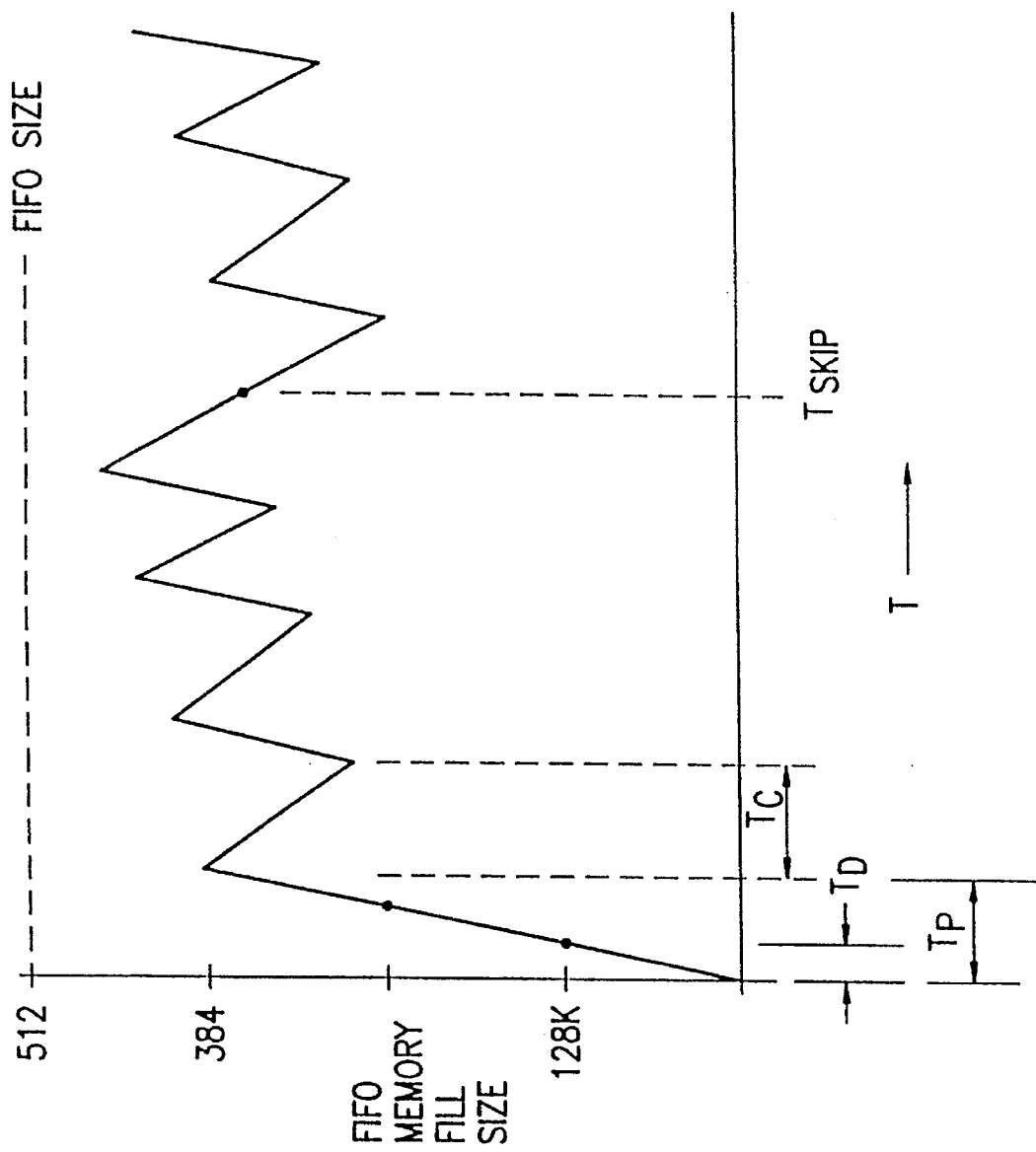
FIG. 10 illustrates the status of a single user's FIFO over time.

FIG. 10 is a diagram showing the amount of video data in a typical FIFO memory buffer in the present invention over a period of time. $T_D$ represents the amount of time a fill operation from the disk array requires and $T_C$ represents the amount of time a drain operation from the FIFO memory buffer requires. FIFO memory buffers 101 and 103 (FIG. 4) are filled from storage system 90 (see FIGS. 2 and 3) during times $T_D$ and emptied during times $T_C$. Although FIG. 10 shows filling and draining operations occurring sequentially, these operations actually occur simultaneously, as the memory buffers function as FIFO buffers.

As FIG. 10 shows, the average fill rate is slightly higher than the average drain rate, which insures that the buffers tend to become more full as operation continues. If the buffers approach being completely filled, one fill operation is skipped. This is denoted by $T_{Skip}$ in FIG. 10. The fast prefetch on startup is also illustrated in FIG. 10 as time $T_P$. $T_P$ should preferably be $<3T_D$.

Occasionally a new user must be given a UTS immediately and a current user must be bumped. For the bumped user, one or more fill cycles are skipped. $T_{Skip}$ could be due to this condition. As the buffers have been kept almost full, skipping the filling cycle will not result in a loss of service to the bumped user.

Video Data Display Modes

Once the UTS has been assigned, playback begins at step 213 (FIG. 7b) and the system enters a new mode of operation. In this mode, at step 215, the system first checks to see if a VCR command has been transmitted from the user. If no command has been received, the system checks at step 233 for the end of the film that was requested. If the film has not ended, the system returns to step 215.

Figure 7A:
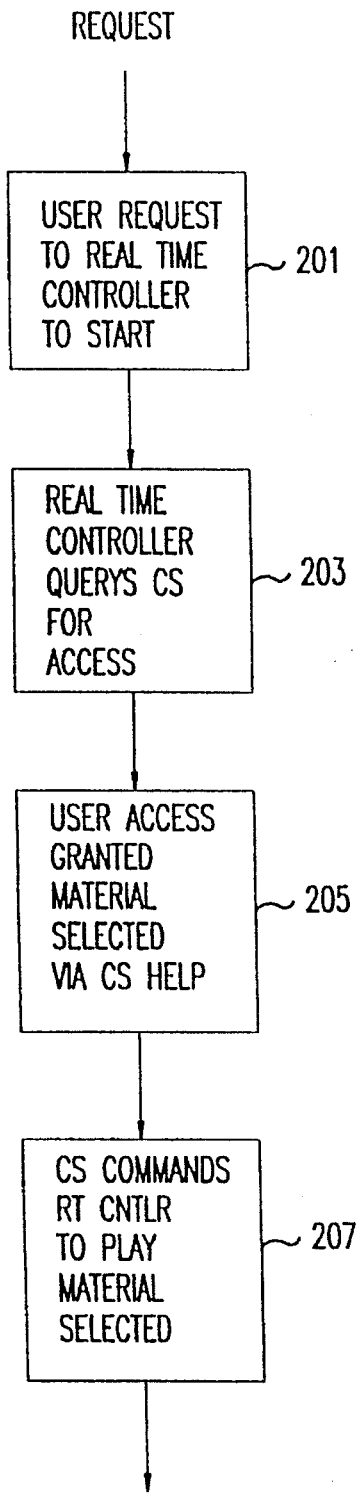
FIGS. 7a through 7d are flow charts illustrating the operation of the present invention.
Figure 7B:
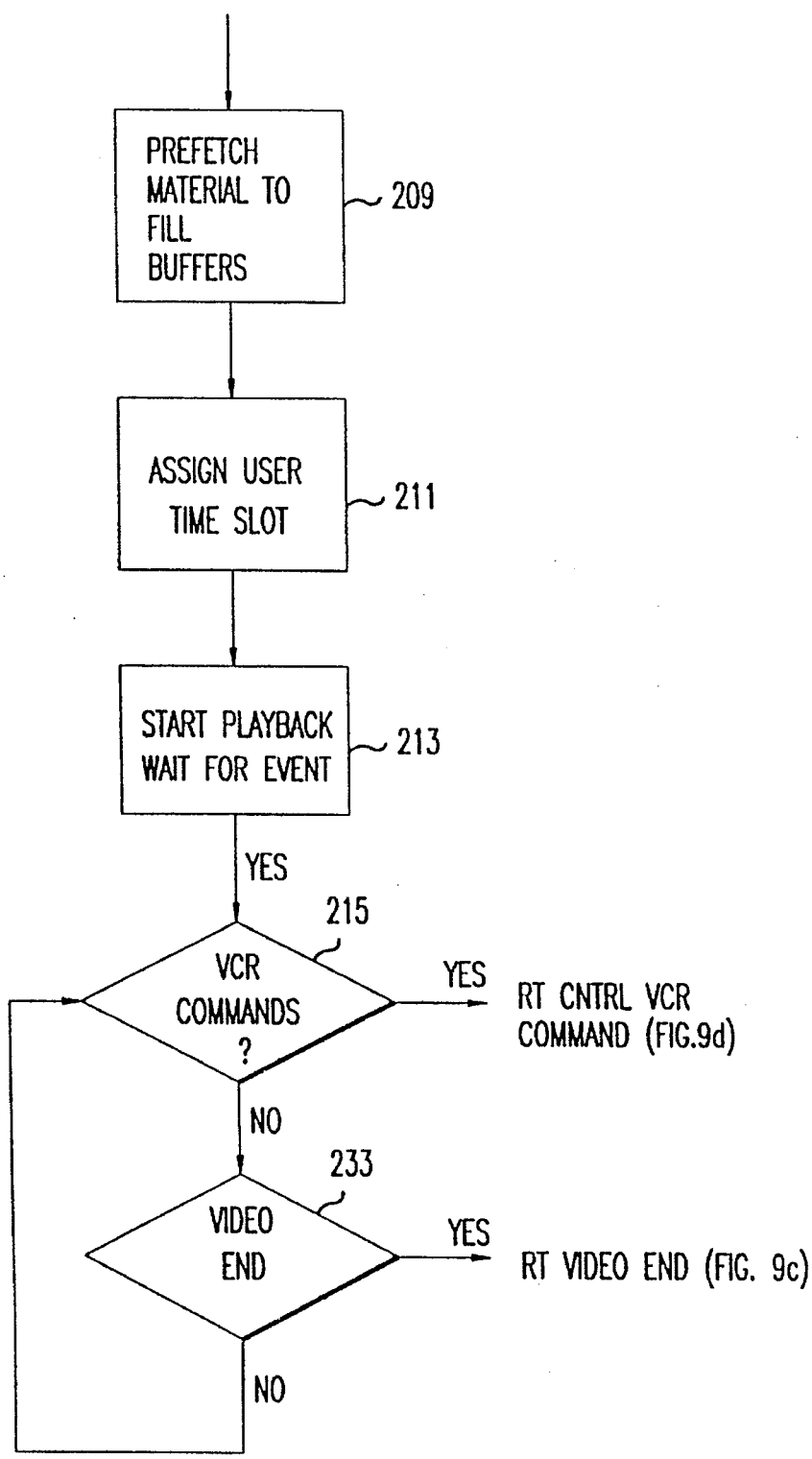
Figure 7C:
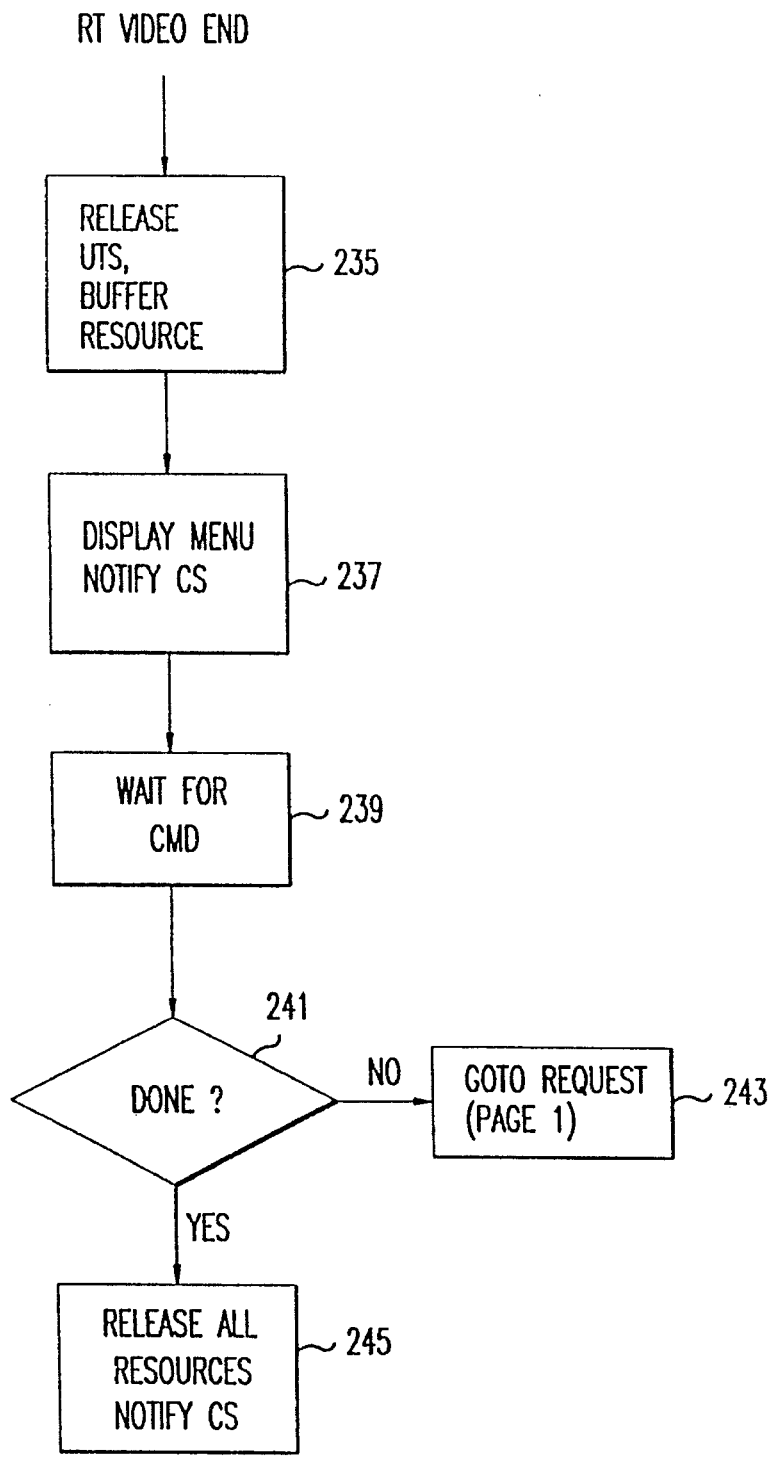
Figure 7D:
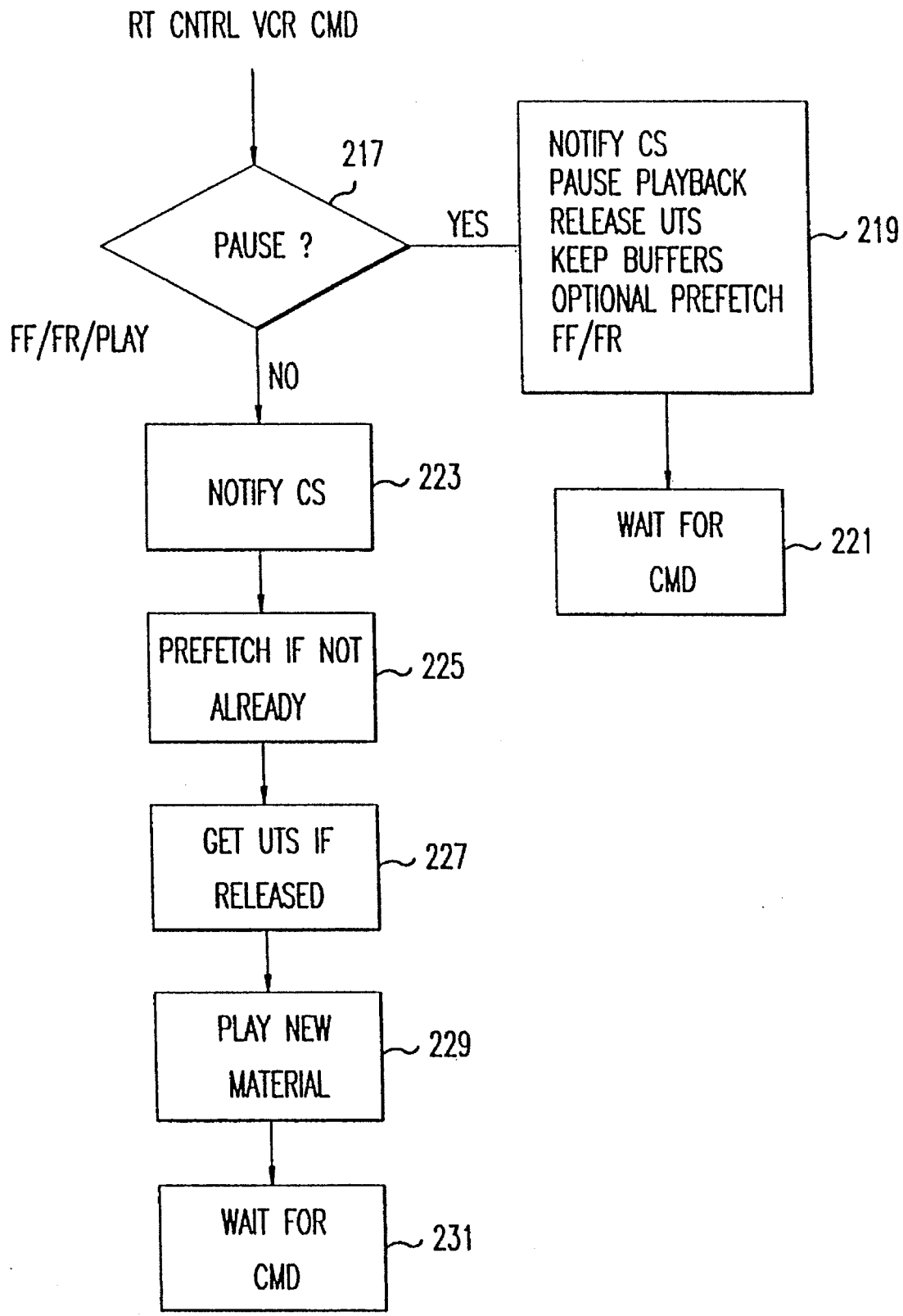

If a VCR command was received at step 215, the system first checks to see if the command is a Pause command at step 217 (FIG. 7d). If the command is Pause, at step 219 control system 50 is notified, the film is paused, the UTS is released, but the assigned buffers in data source 100 are not released. In some embodiments of the present invention, the real time controller would be told to assume that either a FF or FR command follows shortly after a Pause command, and the real time controller would command the data source to begin prefetching either the FF or the FR or both versions of the film being viewed. In either embodiment, the system returns to the waiting for command mode of operation at step 221.

If the command received at step 215 is not a pause command, then it must be a FF, FR or Play command. In this event, the control system is notified at step 223, a prefetch of the relevant version of the requested film is ordered at step 225, a new UTS is assigned at step 227 if the original UTS was released, the new film is played at step 229, and the waiting for command mode of operation begins again at step 231.

FF/FR Operation

The FF and FR versions of movies are stored as separate movies and striped across the disk memories. The layout of the FF and FR versions of the movies is such that when a user switches between play, FF and FR in any order, they are still in the same UTS and on the same disk. This makes low level disk and user I/O scheduling independent of the operational mode that the user requests.

Figure 11:
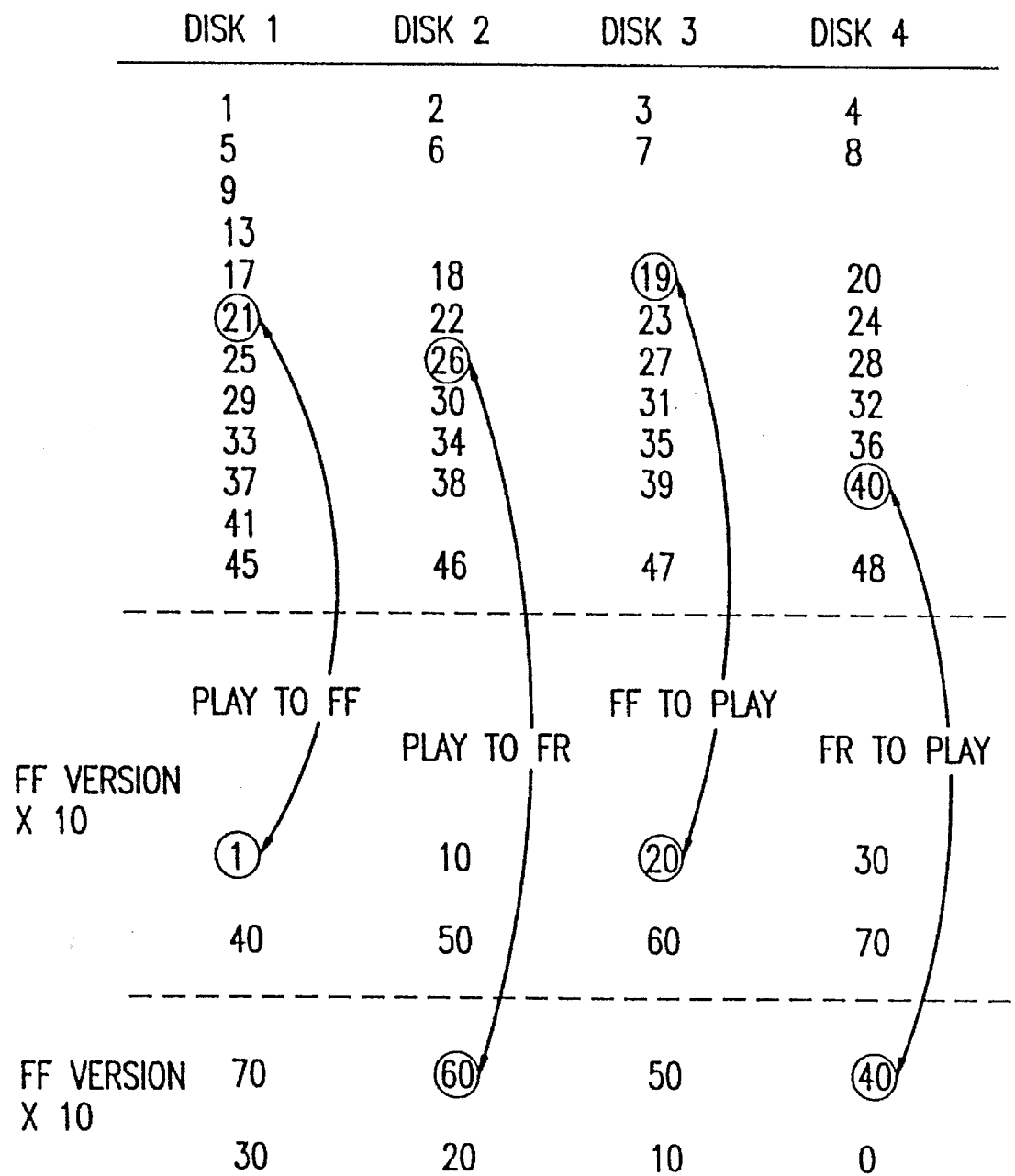
FIG. 11 is a diagram of how the present invention operates in forward and reverse modes.
Figure 12A:
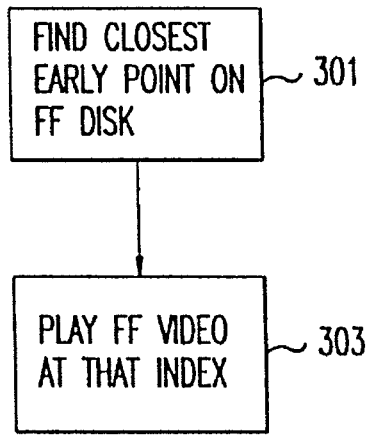
FIGS. 12a through 12d are flow charts showing how the present invention changes operating modes.

The diagram of FIG. 11 and the flow charts of FIGS. 12a through d illustrate how FF and FR are performed in the present invention. The numbers in FIG. 11 are program stripe indexes and are herein called the film's position. If the system is playing a video and requests fast forward, the system finds the closest earlier position of the FF film version which is striped on the disc that the user is currently accessing (FIG. 12a, step 301). Once that position is found, the system begins to play the FF version of the film at that point (step 303). This is shown in FIG. 11 in the first column. Here, the command is received at position 21 in the normal film version. The closest earlier FF portion of the film is segment 1. The FF version is started at this position.

Figure 12C:
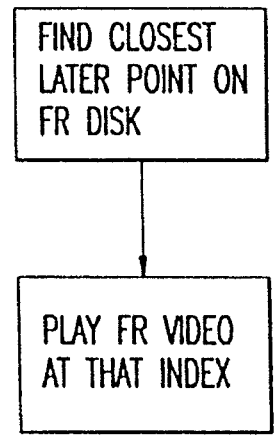
Figure 12B:
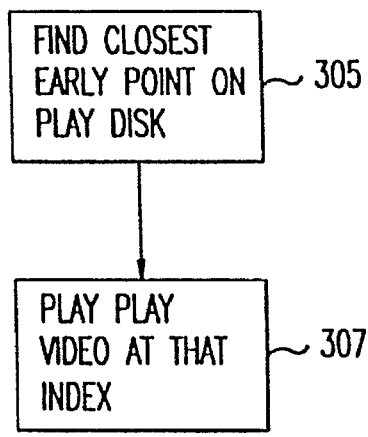

Switching from FF to play involves finding the closest earlier segment of the film on the normal version of the video data program (step 305, FIG. 12b). Once that position is found, play begins at that point (step 307). As shown in FIG. 11, third column, the play command is received when FF segment 20 is being played. On disk 3, the closest earlier segment of the play version is 19, which is where the play version is run from.

Switching from play mode to FR requires the system to find the closest later time segment on the FR version of the video data program which is stored on the disk being accessed (step 309, FIG. 12c). The FR version is then played from that later point. In FIG. 11, second column, the play version of the video data program is at segment 26. The closest latter segment of the FR version of the video data program stored on the same disc is segment 60. This is where the FR version is played from.

Figure 12D:
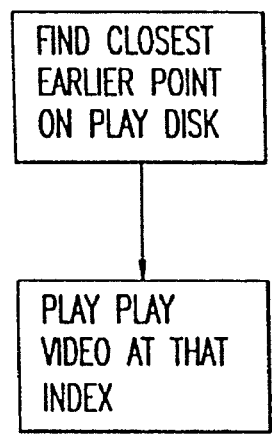

Finally, switching from FR to normal play requires finding the closest earlier point of the play version of the video data program stored on the same disc as the FR version is currently using (step 311, FIG. 12d). Play operations continue from that point (step 313). In FIG. 11, column four, FR version segment 40 is being shown when the command is received to return to play mode. The closest earlier segment of the play version on the same disc is segment 40, which is where play operations continue from.

If at step 233 (FIG. 7b), the system determined that the video data program being viewed had ended, then, at step 235 (FIG. 7c), the system releases the UTS, the FIFO buffers in data source 100, as well as any other system resources that had been assigned to the user. There may be a pause at the end of the video data program to allow the user to rewind and view a portion of the film again before the system releases occur.. Numerous such viewing options can be offered without in any way altering the present invention. A menu of available services then appears (step 237), and the system returns to the waiting for command mode at step 239. If the user is ready to terminate use of the system (step 241), the control system is notified at step 245 and all resources are released. If the user is not ready to terminate, operation returns to step 201 (FIG. 7a).

What is claimed is:

1. In a computer system having a data storage system and a computer, the computer capable of accessing at least a first movie stored in the data storage system and providing the accessed first movie to a user in a play viewing mode which closely approximates the play mode of a video cassette recorder, a method for displaying the movie in a fast reverse mode and a fast forward mode which approximates the fast forward and fast reverse viewing modes of a video cassette recorder, the method comprising the steps of:

editing a first copy of the stored movie to copy one frame from every predetermined number of frames;

storing the frames copied from the first copy in the same order they were copied from the first copy as a second copy in the data storage system;

storing the frames copied from the first copy in the reverse order they were copied from the first copy as a third copy in the data storage system;

displaying the stored second copy if the user request fast forward viewing of the first movie; and displaying the stored third copy if the user request fast reverse viewing of the first movie.

2. The method of claim 1 wherein the second and third copies of the at least first video data program are further edited to remove a predetermined amount of data from the copied frames.

3. A method for providing a user coupled to a communications channel with video data, the method comprising the steps of:

storing a plurality of video data programs, the step of storing a plurality of video data programs further comprising the steps of:
      constructing a plurality of arrays of data storage units;
      storing each of the plurality of video data programs on at least one of the arrays of data storage units;
      dividing the video data program into a plurality of data blocks, each data block having a predefined size;
      storing a first data block on a first data storage unit of the array of data storage units;
      storing successive data blocks on successive data storage units; and
      repeating the steps of storing a first data block and storing successive data blocks if the number of data blocks exceeds the number of data storage units in the array of data storage units;

recalling a video data program when a request for the video data program is received from the user through the communications channel;

formatting the recalled video data program for transmission to the user; and transmitting the formatted video data program to the user, and wherein a plurality of users can access each data storage unit, each user being assigned a time slot having a first defined duration during which first defined duration the user receives blocks of video data from one of the data storage units in the array.

4. A method for providing a user coupled to a communications channel with video data, the method comprising the steps of:

storing a plurality of video data programs, the step of storing a plurality of video data programs further comprising the steps of:
      constructing a plurality of arrays of data storage units;
      storing each of the plurality of video data programs on at least one of the arrays of data storage units;
      dividing the video data programs into a plurality of data blocks, each data block having a predefined size;
      storing a first data block on a first data storage unit of the array of data storage units;
      storing successive data blocks on successive data storage units; and
      repeating the steps of storing a first data block and storing successive data blocks if the number of data blocks exceeds the number of data storage units in the array of data storage units;

recalling a video data program when a request for the video data program is received from the user through the communications channel;

formatting the recalled video data program for transmission to the user; and transmitting the formatted video data program to the user, wherein each video data program is comprised of a play version, a fast forward version, and a fast reverse version, the play, fast forward, and fast reverse versions each being divided into data blocks and stored in parallel to one another on the data storage units of the array, the first data block of the play, fast forward, and fast reverse versions being stored on the first data storage unit and successive data blocks of the play, fast forward, and fast reverse versions being stored on successive data storage units, the process of storing on the first and successive data storage units continuing in parallel until the last data block of each venison has been stored on a data storage unit.

5. The method of claim 4 wherein the user may request any one of the play, fast forward, and fast reverse versions and wherein the user may switch from any one of the versions to any other of the versions during provision of video data to the user.

6. The method of claim 5 wherein when the user switches from a first version to a second version, a data block of the second version stored on the same data storage unit as the data block of the first version currently being accessed is recalled, formatted, and transmitted.

7. The method of claim 4 wherein a predefined number of the plurality of video data programs are stored in a tape storage unit, and further comprising the steps of:

determining if the user has requested a video data program stored in the tape storage unit; and transcribing the requested video data program stored in the tape storage unit to an array of data storage units using the steps of dividing, storing a first data block, storing successive data blocks, and repeating the storing steps.

8. The method of claim 7 wherein a predetermined first portion of each of the video data programs stored in the tape storage unit is transcribed to at least one array of data storage units, the remaining portion of each video data program being transcribed to the array after a user requests the video data program, the user being provided with the predetermined portion while a remaining portion of the video data program is being transcribed.

9. The method of claim 4 wherein the fast forward and fast reverse versions comprise a predetermined fraction of the play version, the video data of the fast forward version being recorded in the same order as the video data of the play version, and the video data of the fast reverse version being recorded in reverse order to the video data of the play version.

10. A system for providing at least video data to a plurality of users, the system comprising:

data storage system for storing at least video data, the data storage system further comprising:
  an archival tape storage system, for storing at least a plurality of video data programs; and
  a plurality of disk drives coupled to the archival tape storage system, the disk drives receiving and storing the video data programs from the archival tape storage system and providing faster access to the video data programs than the archival tape storage system; and
  a plurality of disk interfaces coupled to the data sources and the disk drives for providing data sources with access to the video data programs stored on the disk drives;

a plurality of data sources coupled to the data storage system for formatting the video data recalled from the data storage system for transmission;

a switch coupled to each of the data sources and to a plurality of communications channels, the switch directing the packaged video data from a data source to a communications channel;

a first controller coupled to the switch, the data sources, and the data storage system, the first controller controlling the connection of the data storage system to the data sources, the data sources to the switch, and the switch to the communications channel, the first controller making the connections at least partially in response to user requests received from users over the communications channels; and a second controller coupled to the first controller, the second controller controlling system access by users, each data source further comprising:

a plurality of FIFO memory buffer pairs, at least a FIFO memory buffer pair being available to each user coupled to the data source, the first FIFO memory buffer in the pair receiving video data from the data storage system and the second FIFO memory buffer in the pair receiving other data from the first and second controllers;

a selector switch coupled to the FIFO memory buffer pairs for selecting which FIFO memory buffer pair to transmit data;

a rate generator coupled to the selector switch for providing a timing signal to the selector switch to determine the length of time that a FIFO memory buffer pair will transmit data;

a third controller coupled to the rate generator and the data storage system for selecting which FIFO pair will be coupled to the data storage system and for determining the rate the rate generator must generate; and a multiplexer coupled to the selector switch and a communications channel for formatting data from the first and second FIFOs for transmission over the communications channel.

11. The system of claim 3 wherein the switch can couple any one of the plurality of data sources to any one of the communications channels.

12. The system of claim 10 wherein each of the plurality of video data programs are stored in the archival tape storage system in a play version, a fast forward version, and a fast reverse version, the play version comprising the entire video data program, the fast forward version comprising a predetermined fraction of the play version, and the fast reverse version comprising the same predetermined fraction of the play version, but stored in the archival tape storage system in reverse order to the play and fast forward versions, the three versions of the video program being written to the disk drives when a user requests the video data program.

13. The system of claim 12 wherein the video data programs are transcribed from the archival tape storage system to the plurality of disk drives when a user requests the video data program, each of the plurality of disk drives receiving a predetermined fraction of each of the three versions of the video program.

14. The system of claim 13 wherein the FIFO memory buffer pair assigned to a user receives video data from each of the disk drives upon which a portion of the version of the video data program that the user has requested has been transcribed, each disk drive transmitting the video data in sequential fashion to the FIFO memory buffer pair prior to the FIFO memory buffer pair transmitting the video data program to the user.

15. The system of claim 13 wherein the user can select between the fast forward version, the fast reverse version, and the play version at any time, the system transmitting the user selected version from the disk drives to the FIFO pair assigned to the user under the control of the first controller after the first controller has received the user's request from the communication channel.

16. A video server for providing at least video data, the video server coupled to a distribution network with a plurality of communication channels, the distribution network coupled to a plurality of users, the video server comprising:

a plurality of data sources for receiving at least video data from a plurality of sources and formatting the at least video data for transmission to users;

first switch coupled to the distribution network and to the data sources, the first switch capable of coupling any one of the plurality of communication channels to any one of the plurality of data sources;

a data storage system comprised of a plurality of data storage units for storing the at least video data;

second switch coupled to the data sources and the data storage system, for coupling any one of the plurality of data storage units to any one of the plurality of data sources;

first control system coupled to the first switch, the second switch, and to the data sources for controlling the coupling of the data storage system to the data sources and the coupling of the data sources to the communications channel; and second control system coupled to the first control system for indicating which users may access the server, the data sources further comprising:

a plurality of FIFO memory buffers, the FIFO memory buffers being coupled to a data storage input port and a network port, the FIFO memory buffers storing video and other data received through the ports in a first-in, first-out order;

a selector switch coupled to the FIFO memory buffers;

a multiplexer/demultiplexer coupled to the selector switch and the network port;

a rate generator coupled to the selector switch for generating a plurality of different timing frequencies to control the flow of data from the FIFO memory buffers through the selector switch to the multiplexer/demultiplexer; and a data source controller coupled to the rate generator and the data storage input port for controlling the flow of data into the FIFO memory buffers from the data storage system and the network port and for controlling the flow of data from the FIFO memory buffers into the selector switch.

17. The video server of claim 16 wherein the data storage system comprises:

a long-term data storage system with a first defined access time and a first defined storage capacity;

a short-term data storage system coupled to the long-term data storage system, the short-term data storage system having a second defined storage capacity, the second defined storage capacity being less than the first defined storage capacity, and a second defined access time, the second defined access time being less than the first defined access time; and a plurality of data storage interfaces coupled to the short-term data storage system and to the data sources for accessing and commanding the short-term data storage system to transmit data to the data sources and for accessing and commanding the long-term data storage system to download data to the short-term system.

18. The video server of claim 17 wherein the first control system receives user commands from the users over the distribution network through the first M/D switch and controls the data sources, first and second M/D switch, and data storage system in response to the commands.

19. The video server of claim 18 wherein the second control system is coupled to at least one external computer system, the external computer system providing at least accounting support to the video server.

20. The video server of claim 18 wherein the long-term data storage system stores a plurality of video data programs, each video program being stored in a first, play version, a second, fast forward version, and a third, fast reverse version.

21. The video server of claim 20 wherein the short-term data storage system is comprised of a plurality of disk storage units, a predefined number of disk storage units forming a one dimension array of disk storage units.

22. The video server of claim 21 wherein the fast forward, play, and fast reverse versions of a video program are transcribed from the long-term storage to a selected one dimension array of disk storage units when a user requests the video/audio program, predefined blocks of each version being transcribed successively to each of the disk storage units in succession.

23. The video server of claim 22 wherein the first control system assigns a data source to a user after the first control system has received a request for system access by a user, the first control system has transmitted the request to the second control system, the second control system has determined that the user is permitted system access, and the second control system has communicated to the first control system that the user is permitted access to the server.

24. The video server of claim 23 wherein a portion of the version of the video program selected by the user is transmitted from the disk storage units to the FIFO memory buffer assigned to the user by successive access to the one dimension array of disk storage units, the FIFO memory buffer being filled to a predetermined percentage of its capacity before the program is transmitted to the user.

25. The video server of claim 24 wherein the buffer pair is refilled at a rate continuously recalculated to insure sufficient video/audio data in the buffer pair to insure that the program is supplied to the user without interruptions.

26. The video server of claim 24 wherein the user can select any stored version of the program he has selected at any time during the user's permitted access to the server, the buffer pairs being filled with the newly selected version in the same manner that they were filled when the user first selected a version of the program.

27. The video server of claim 20 wherein the programs are stored in the long-term storage system in a compressed form.

28. In a video server comprised of a memory system, a plurality of data formatting units coupled to the memory system, and a control system coupled to the data formatting units and the memory system, the memory system further comprising a plurality of arrays of disk drives, a method for providing video data programs to users, the users being coupled to the video server through a plurality of communication channels, the method comprising the steps of:

striping each individual video data program across the disk drives that comprise one disk drive array, detecting a user request for a video data program transmitted to the video server over one of the communications channels;

coupling the disk drive array that contains the requested video data program to a data formatting unit;

coupling the selected data formatting unit to a communication channel coupled to the user; and sequentially reading the requested video data program from the disk drive array upon which it is stored;

formatting the sequentially read data in the selected data formatting unit; and transmitting the formatted video data to the user, wherein each video data program comprises a first play video data program, a second fast forward video data program comprised of a selected set of the video data that comprises the play video data program stored in the same sequence as the video data in the play video data program, and a third fast reverse video data program comprised of a selected set of the video data that comprises the play video data program stored in reverse order to the video data in the play video data program, the first second and third programs each being striped across the same array of disk drives.

29. The method of claim 28 further comprising the steps of:

sequentially reading, formatting and transmitting the second fast forward video data program if the user indicates that the video data program should be shown in a fast forward viewing mode; and sequentially reading, formatting and transmitting the third fast reverse video data program if the user indicates that the video data program should be shown in a fast reverse viewing mode.

* * * * *